Figure 1:
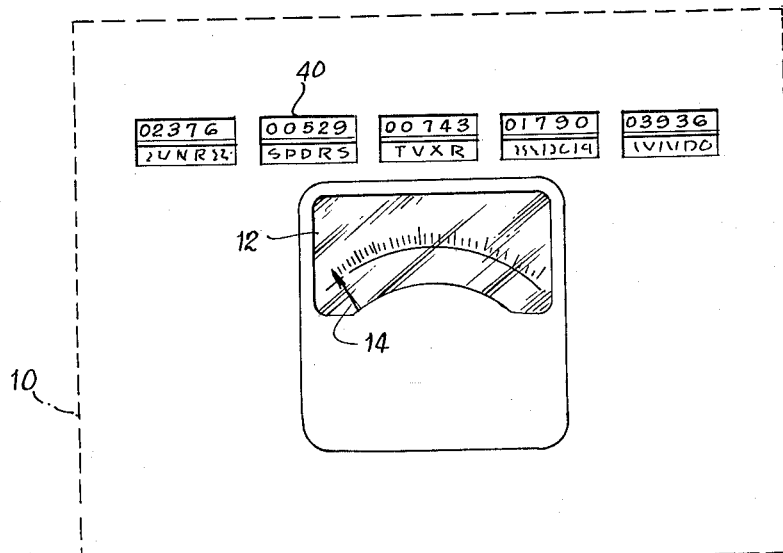

March 15, 1966   H. A. LEAH   3,241,065
PERIODICALLY CHANGED METER POINTER DEVICE FOR ACTUATING
COUNTERS TO DIGITALLY RECORD THE POINTER POSITIONS
Filed Nov. 10, 1961

INVENTOR.
Hugh Alan Leah
BY
Ooms, McDougall & Hersh
Att'ys

United States Patent Office 3,241,065
Patented Mar. 15, 1966

3,241,065
PERIODICALLY CHANGED METER POINTER DEVICE FOR ACTUATING COUNTERS TO DIGITALLY RECORD THE POINTER POSITIONS
Hugh Alan Leah, London, Ontario, Canada, assignor to American Gage & Machine Company, Chicago, Ill., a corporation of Illinois
Filed Nov. 10, 1961, Ser. No. 151,484
1 Claim. (Cl. 324—99)

This invention relates to a digital recording apparatus designed for the recording and storing of information in digital form whereby it can be studied at some subsequent time. The recorders of this invention are designed to supply digital information of the type which reflects variations in various systems. In this respect the devices of this invention can be provided as alternative means for providing information which has heretofore been supplied by means of chart recorders. Thus, the digital information supplied can be employed for various purposes instead of the analog information conventionally provided on charts by means of a recording pen which is deflected in accordance with variations in a phenomenon being studied.

Most of the present conventional chart recorders involve either a moving coil driving mechanism of a self-balancing type potentiometer whereby the subject matter to be recorded, if not of varying electrical quantity, can be converted to such a quantity before recording. In the conventional recorders of the chart type a record is presented by means of a pen which deflects with respect to a moving chart. It is well known that considerable effort must be expended in order to accurately analyze the information provided on such charts.

Power factor measurement and field strength measurement are examples of applications for recording mechanisms. In power factor measurement a recorder is ordinarily connected to a line for a lengthy period. If a conventional chart recorder is employed, a lengthy analysis of the chart record developed is required so as to define precisely what percentage of time the power factor fell into certain specified ranges.

In the case of field strength measurement it is many times desired to determine the field strength at various receiving locations remote with respect to radio and television transmitters. In such tests several sites may be investigated simultaneously over many months so as to determine signal levels and in order to learn the percentage of time during which the signal levels would provide satisfactory reception. It will be apparent that in tests of this type an extremely extensive analysis of a paper chart would be required if such a recording technique were employed.

These are other well known areas wherein the use of recorders has been found desirable and where conventional chart recorders have been employed. Such recorders are, in many cases, misemployed, and it is well known that the recorders are expensive and difficult to maintain. The recorders must be supplied with ink and charts and must be inspected at regular intervals. In addition, it is necessary to provide expensive housings for the delicate equipment to avoid exposure to extreme environmental conditions.

It is an object of this invention to provide a recording mechanism which will provide information in digital form and which is also particularly suitable as a substitute for chart recorders in certain specific applications.

It is an additional object of this invention to provide a digital recording system which is adaptable for power factor measurement, field strength measurement and for similar applications, and which provides direct information whereby extensive analysis for determination of certain conditions is not required.

It is a further object of this invention to provide improvements over existing recorders by providing a novel recorder which is characterized by a comparatively simple operating technique and which is capable of inexpensive operation.

It is a more specific object of this invention to provide a digital recorder which will record data selectively within specific areas over an extensive range and which is also extremely versatile whereby it can be adapted for various recording frequencies and for various numbers of recording areas.

Figure 2:
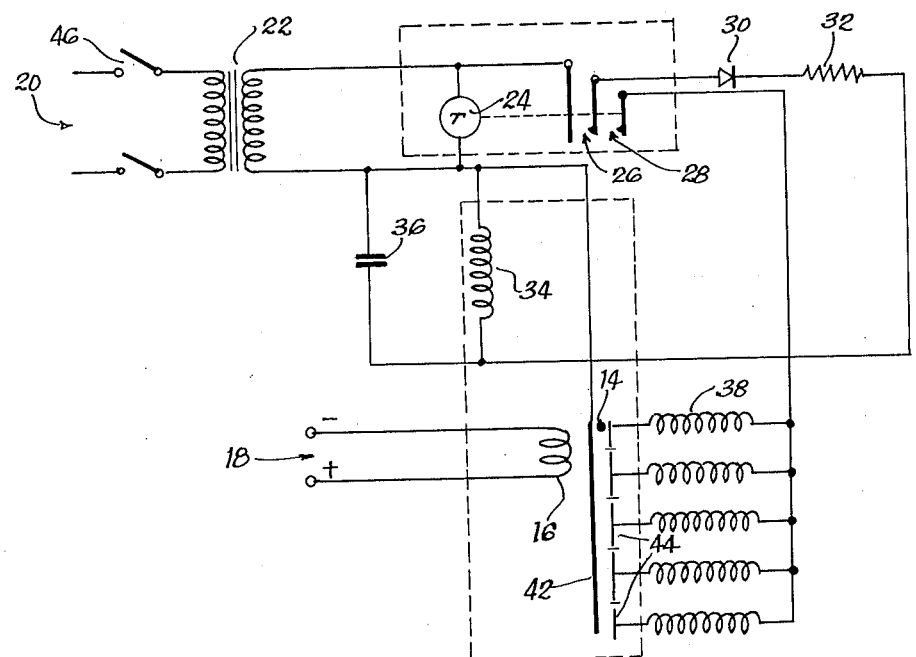

These and other objects of this invention will appear hereinafter and for purposes of illustration, but not of limitation, a specific embodiment of this invention is shown in the accompanying drawings in which:

FIGURE 1 is a diagrammatic plan view of a digital recorder adapted to operate in accordance with the above objects; and FIGURE 2 is a schematic circuit diagram suitable for use in accordance with the principles of this invention.

The mechanisms of this invention include the provision of a movable, electrically conductive clamping means adapted to be positioned within a recorder housing adjacent the pointer of the recorder. The pointer, which conventionally traverses a calibrated indicating dial, is provided with an electrically conductive portion which is positioned in line with the movable clamping means. A plurality of contacts are provided on the side of the pointer opposite the clamping means, and means are provided for moving the clamping means at preselected intervals whereby any one of several circuits within the recorder can be periodically completed through the contacts, pointer and clamping means. Included within each of the circuits are electro-responsive means which are adapted to actuate counters. A counter is provided for each of the circuits, and one of the several counters is adapted to be stepped up each time one of the circuits is closed.

The clamping means employed in the mechanisms of this invention is adapted to hold the pointer stationary when moving into contact therewith. Thus, the particular position of the pointer during actuation of the clamping means will determine which of the several circuits will be completed. Specifically, the position of the pointer during each of the various clamping intervals will determine which of the counters will be stepped up and, accordingly, the frequency of location of the pointer at a certain point or within a certain range can be determined by reading the various counters.

The accompanying drawings illustrate a specific embodiment of this invention and will also serve to more thoroughly define the operation of the invention. In the embodiment shown, a recorder 10 is provided with a dial 12 and an associated pointer 14. The pointer is adapted to move in accordance with the amount of current directed to the coil 16 which is fed from the terminals 18. It will be apparent that the source of power for the coil 16 is not critical. Thus, the concepts of this invention are equally applicable whether the recorder is provided for directly reading variations in a power line or whether the current in coil 16 is analogous to some other variable condition.

An A.C. source 20 is provided for supplying the primary of transformer 22. Connected across the transformer secondary there is provided a timer 24 which, when operating, is adapted to periodically close the contacts 26 and 28. Timer 24 is in the nature of an electric clock mechanism and is per se well known.

As illustrated, closing of the contacts 26 will complete a circuit through the rectifier 30 and resistor 32 and to a clamping coil 34 and a capacitor 36 disposed in parallel therewith. The switch 28 is included in a circuit leading to the coils 38. Each of the solenoid coils 38 is connected to a counter and the coils are adapted to step up their associated counters by one digit each time they are energized. In turn, each of the counters is adapted to provide a visible record which can be seen through the windows 40 in the recorder 10. It will be apparent that any other electro-responsive means capable of directly or indirectly stepping up counters can be substituted for the coils 38.

The structural details of the electromagnetic stepping counters associated with the coils 38 are not shown for the reason that such solenoid-actuated counters are per se conventional and well known in the art.

The coils 38 are adapted to be energized when current is supplied thereto by means of the transformer 22. Energization of one of the coils is accomplished by simultaneous closing of the switch 28 and energization of the clamping coil 34. In this connection, the coil 34 is adapted to move conductive clamping bar 42 into contact with the pointer 14 which is also conductive, at least in the portion which contacts the bar. Insulated conductive members 44 provide contact areas respectively in circuit with each of the coils, and movement of the bar 42 is adapted to clamp the pointer into contact with the areas 44. With this arrangement, one of the coils 38 will be energized each time the coil 34 is energized. The particular coil 38 to be energized will, of course, depend upon the position of the pointer 14.

As an illustration of the operation of the recorder of this invention, the recorder can be inserted in a circuit such as a field-strength measuring device, wherein voltage variations are known to occur and where it is desired to discover the relative incidence of voltages within certain ranges. Assuming that variations from zero to over 200 microvolts can be expected, five counters can be provided to record the ranges 0–50, 50–75, 75–100, 100–200 and over 200 microvolts, respectively. Five contact areas 44 will thus be formed whereby the pointer 14 will be opposite a particular one of the areas whenever the pointer indicates on the dial a value within a particular range. For example, if the pointer is positioned corresponding to a reading of 80 microvolts, the pointer will be disposed opposite the middle contact 44. Similarly, if the pointer reads 210 microvolts, the pointer will be opposite the end contact area 44.

To begin a recording operation switches 46 will be closed thus commencing the operation of the timer 24. The timer can be set for any cycle duration, and a 10 second cycle is cited as a suitable example.

With the timer operating at 10 second intervals the contacts 26 and 28 will, of course, be momentarily closed every 10 seconds. Accordingly, current will be simultaneously fed to the coil 34 and to one end of the coils 38 each time the contacts are closed. Upon energization of the coil 34, clamping bar 42 will move against the pointer 14 completing a circuit through one of the coils 38. Therefore, the counter associated with this coil 38 will be stepped up by one digit at this time. If the voltage remains essentially constant, this same counter will be stepped up again and again every 10 seconds. On the other hand, variations in the voltage outside of the range for this particular counter will result in stepping up of one or more of the other counters. Thus, the totals indicated on the various counters will enable a determination of the percentage of time the voltage lay within any one the ranges.

As noted, the recorder of this invention is suitable for use whether the coil 16 is directly incorporated in a power line or is fed an analogous current corresponding to field strength variations, temperature variations or other functions. The results recorded will serve to provide a record of the percentage of incidence of the pointer within any of several ranges on a scale. The timing sequence can obviously be varied, depending on the accuracy desired in the record.

Furthermore, the recorder is useful for detecting suspected conditions at certain periods of time which would not be revealed in records taken over a long period. Thus, for example, in the measurement of field strength it may appear when studying records taken over a long period that either of two sites give almost identical results in the over-all percentage of time in which field strength is considered acceptable. However, if it is suspected that one site will yield a higher field strength during a more important viewing or listening period, the device of this invention can be used for verifying these suspicions. Specifically, the strengths at the respective sites can be recorded only at this more desirable time and recording of results at other times will thus not influence the final results.

The present invention can be employed to record measurements at any desired rate. In applications where paper chart recorders are employed, a great deal of unnecessary expense and undue use of material results, since factors such as temperature, power factor and pressure density may change at very slow rates. With this invention a record can be made at any rate desired and a great deal of irrelevant data may thus be eliminated. At the same time, the mechanism of this invention can be operated at high counting rates whenever rapid variations can be anticipated in the variables being studied.

Many possible variations of the inventive mechanism may be made within the spirit of the invention. For example, a mechanically actuated and timed means capable of directly or indirectly moving the bar 42 into the clamping position could be substituted for the coil 34.

It will be apparent that the invention provides a recorder which will present data in a readily readable fashion, avoiding time consuming chart or tape analysis. The recorder of this invention is suitable for use over a long period of time without the need for constant maintenance or replacement of charts, tape, recording pens or ink supply. The recorder is designed to record any function which can be presented to the recorder in the form of an electric current which varies in a manner analogous to changes in the function.

It will be understood that the described embodiment of the invention is illustrative only; the scope of this invention is to be determined primarily with reference to the following claim.

I claim:

In a meter of the type including a pointer adapted to be positioned in accordance with variations in current fed to the meter and a scale covering a range of values over which said pointer moves, the improvement comprising digital recording means associated with the meter, said recording means including a plurality of counters, each of said counters being adapted to record the frequency with which said current falls within one of a plurality of individual ranges on said scale, the sum of said individual ranges covering the totality of the aforementioned range of values whereby all positions of said pointer are encompassed by said individual ranges, electro-responsive means associated with each of said counters for stepping up such counter, said pointer having an electrically conductive portion, a plurality of separate, closely spaced contact elements positioned adjacent the path of movement of the conductive portion of the pointer, the number of said contact elements corresponding to the number of said ranges with each contact element corresponding in extent to one of said individual ranges, a movable conductive clamping bar disposed on the side of the path of movement of said pointer opposite to said contact elements, electro-magnetic means operative when energized to advance said clamping bar into contact with the conductive portion of said pointer whereby the pointer is clamped between said bar and one of said contact elements, a timer adapted to energize said electro-magnetic means at regular intervals, each of said contact elements being electrically connected to one of said first-mentioned electro-responsive means, and circuits including said first mentioned electro-responsive means, said bar, said pointer and said contact elements operative to step up one of said counters each time said bar moves into contact with said pointer whereby each of said counters individually records for one of said individual ranges.

References Cited by the Examiner

UNITED STATES PATENTS

| | | | |
|---|---|---|---|
| 1,678,181 | 7/1928 | Durgin | 200—56 |
| 1,873,983 | 8/1932 | Sieber | 324—157 |
| 2,315,709 | 4/1943 | Hudson | 235—91 X |
| 2,823,276 | 2/1958 | Bibb | 200—56 |

WALTER L. CARLSON, *Primary Examiner.*